US012747667B2

(12) United States Patent
Prins et al.

(10) Patent No.: US 12,747,667 B2
(45) Date of Patent: Sep. 29, 2026

(54) TURBINE TIP SHROUD REMOVAL FEATURE

(71) Applicant: Solar Turbines Incorporated, San Diego, CA (US)

(72) Inventors: Garrett P Prins, Poway, CA (US); Sudhakar Bollapragada, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/677,688

(22) Filed: May 29, 2024

(65) Prior Publication Data

US 2024/0318562 A1 Sep. 26, 2024

Related U.S. Application Data

(63) Continuation of application No. 17/644,229, filed on Dec. 14, 2021, now abandoned.

(51) Int. Cl.
*F01D 5/22* (2006.01)
*F01D 5/14* (2006.01)

(52) U.S. Cl.
CPC ............. *F01D 5/225* (2013.01); *F01D 5/143* (2013.01); *F05D 2220/321* (2013.01); *F05D 2240/11* (2013.01); *F05D 2240/307* (2013.01); *F05D 2240/70* (2013.01)

(58) Field of Classification Search
CPC .......... F01D 5/225; F01D 5/143; F01D 11/08; F01D 25/246; F05D 2220/321; F05D 2240/11; F05D 2240/307; F05D 2240/70; F05D 2230/70
See application file for complete search history.

(56) References Cited

U.S. PATENT DOCUMENTS 5,927,942 A * 7/1999 Stahl ........................ F01D 11/08 415/115
6,139,257 A * 10/2000 Proctor ...................... F01D 9/04 415/115
6,402,466 B1 6/2002 Burdgick et al.
(Continued)

FOREIGN PATENT DOCUMENTS

CA 2554121 A1 * 2/2007 ............ F01D 11/005
EP 1462616 B1 * 6/2011 ........... F01D 25/246

OTHER PUBLICATIONS

European Extended Search Report for EP Patent Appln. No. 22207932.9, mailed Apr. 14, 2023 (7 pgs).

*Primary Examiner* — Chelsea E Stinson
*Assistant Examiner* — Eric A Lange

(57) ABSTRACT

A tip shroud, comprising a plurality of tip shoes encircling a rotor assembly, in a turbine may deform due to thermal gradients experienced during operation of the turbine. This can make it difficult to remove the tip shroud during disassembly of the turbine. In an embodiment, to facilitate consistent and reliable removal of the tip shroud during each disassembly of the turbine, one or more, including potentially all, of the tip shoes of a tip shroud may be provided with one or more radially protruding puller hooks. Each puller hook enables an axial force to be transferred by one or more tools to an axially inner surface of the puller hook, to thereby produce axial movement of the tip shoe out of the tip shroud.

19 Claims, 5 Drawing Sheets

(56) References Cited

U.S. PATENT DOCUMENTS

| | | | | |
|---|---|---|---|---|
| 6,899,518 | B2 * | 5/2005 | Lucas | F01D 11/08 415/173.1 |
| 8,246,297 | B2 | 8/2012 | Jain et al. | |
| 9,677,428 | B2 | 6/2017 | Holmes et al. | |
| 9,845,696 | B2 | 12/2017 | Lefebvre et al. | |
| 10,557,366 | B2 | 2/2020 | Ciamarra et al. | |
| 2005/0004810 | A1 | 1/2005 | Tanaka | |
| 2007/0025836 | A1 | 2/2007 | Nichols et al. | |
| 2009/0067994 | A1 | 3/2009 | Pietraszkiewicz et al. | |
| 2010/0014985 | A1 * | 1/2010 | Jain | F01D 25/12 416/189 |
| 2010/0068041 | A1 * | 3/2010 | Nigmatulin | F01D 25/246 415/173.1 |
| 2014/0127006 | A1 | 5/2014 | Romanov et al. | |
| 2016/0017743 | A1 | 1/2016 | Duguay | |
| 2016/0281526 | A1 * | 9/2016 | Yamazaki | F01D 25/246 |
| 2017/0101882 | A1 * | 4/2017 | Sippel | F01D 11/005 |
| 2020/0032669 | A1 | 1/2020 | Roberts | |

* cited by examiner

TURBINE TIP SHROUD REMOVAL FEATURE

TECHNICAL FIELD

The embodiments described herein are generally directed to a tip shroud of a turbine, and, more particularly, to features that facilitate removal of a tip shroud during disassembly of a turbine.

BACKGROUND

Some turbines comprise a tip shroud that forms a ring or annulus around the rotor assembly. The tip shroud may comprise a plurality of curved segments, referred to as "tip shoes." These tip shoes are assembled into the complete tip shroud with tight tolerances.

Due to thermal gradients, a tip shoe may deform over time, relative to its original, curved shape. This deformation of the tip-shoe geometry may result in one or more tip shoes becoming locked or stuck during disassembly.

The current solution to this problem is to provide a threaded jacking hole on the aft side of each tip shoe. A jacking tool (e.g., slide hammer) is screwed into the threaded jacking hole of a tip shoe to pull the tip shoe axially from the assembly. However, it is common for the threads of the jacking hole in a tip shoe to deteriorate and break over time due, for example, to wear and oxidization. When this happens, it becomes difficult to dislodge the respective tip shoe from the assembly.

U.S. Patent Pub. No. 2016/0281526 discloses a shroud segment with a radially outward facing groove that engages with a radially inward facing projection of a turbine case. The shroud segment has a pressure receiving portion to which a radially inward force may be applied. This force disengages the groove from the projection, so that the shroud segment can be removed from the turbine case.

The present disclosure is directed toward overcoming one or more of the problems discovered by the inventors.

SUMMARY

In an embodiment, a tip shoe comprises: a body with an upstream end and a downstream end, relative to a longitudinal axis; and at least one puller hook protruding from the downstream end of the body along a radial axis that is orthogonal to the longitudinal axis.

In an embodiment, a turbine comprises: one or more rotor assemblies; a tip shroud encircling at least one of the one or more rotor assemblies and concentric with the at least one rotor assembly around a longitudinal axis of the turbine, wherein the tip shroud includes a plurality of tip shoes, and each of the plurality of tip shoes comprises a body with an upstream end and a downstream end, relative to the longitudinal axis, and at least one puller hook protruding from the downstream end of the body along a radial axis that is orthogonal to the longitudinal axis.

In an embodiment, a method is disclosed for removing a tip shoe from a turbine, the tip shoe comprising a body with an upstream end and a downstream end, relative to a longitudinal axis, and at least one puller hook protruding from the downstream end of the body along a radial axis that is orthogonal to the longitudinal axis. The method comprises: placing a first end of a tool in contact with an axially inner surface of the at least one puller hook; and applying a force at a second end of the tool that transfers force to the axially inner surface of the at least one puller hook to move the tip shoe in a first axial direction that is parallel to the longitudinal axis.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
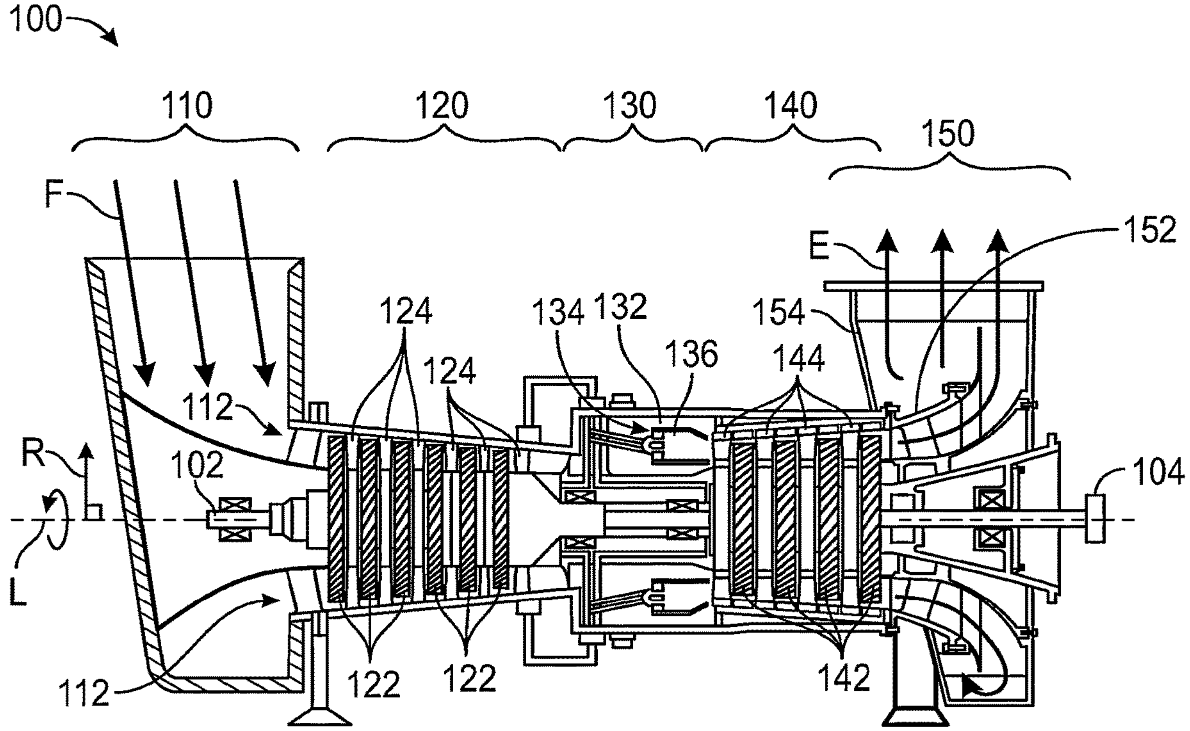
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and case of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The combusting fuel-gas mixture drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred (e.g., to an external system) via power output coupling 104.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
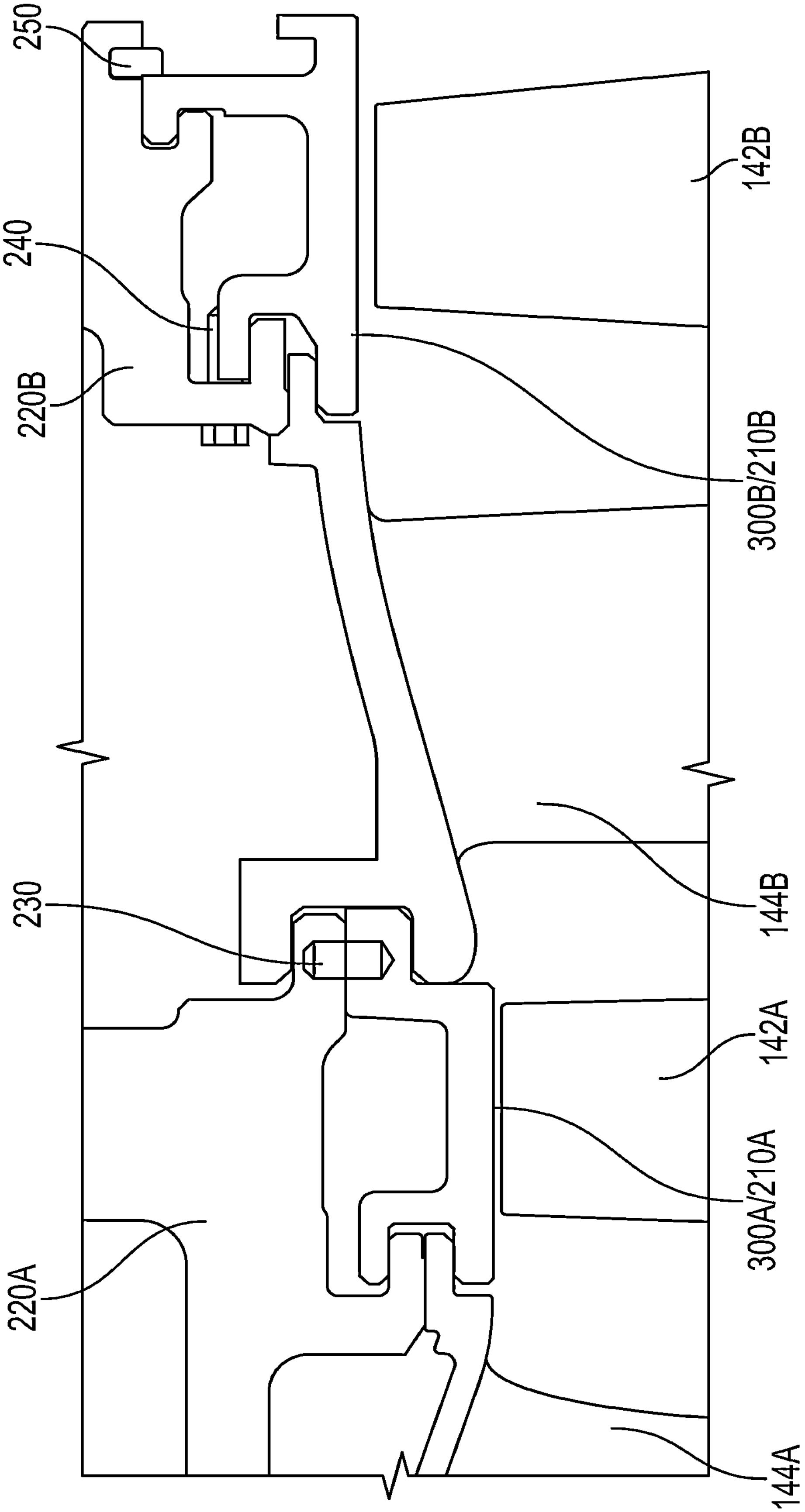
FIG. 2 illustrates a cross-sectional view of tip shoes within two stages of a turbine, according to an embodiment.

FIG. 2 illustrates a cross-sectional view of tip shoes within two stages of a turbine, according to an embodiment. In particular, two tip shoes 300A and 300B are illustrated within a portion of the structure of turbine 140. Tip shoe 300A is a segment of a tip shroud 210A encircling a rotor assembly 142A representing the first stage of turbine 140 and downstream from a stator assembly 144A, and tip shoe 300B is a segment of a tip shroud 210B encircling a rotor assembly 142B representing the second stage of turbine 140 and downstream from a stator assembly 144B. While tip shoes 300 are illustrated in the first stage and second stage of turbine 140, it should be understood that similar or identical tip shoes 300 may be incorporated into any stage and any combination of stages of turbine 140, including stages of turbine 140 that are not illustrated. It should also be understood that each of tip shoe 300A and 300B is a segment in a tip shroud 210. Each tip shroud 210 forms an annulus around a respective rotor assembly 142, is concentric with the respective rotor assembly 142 around longitudinal axis L of turbine 140, and comprises a plurality of identically or similarly configured tip shoes 300.

In an embodiment, one or more, including potentially all, tip shoes 300 may be rotationally fixed relative to a support ring 220, in order to prevent tip shroud 210 from rotating around longitudinal axis L relative to support ring 220. For example, tip shoe 300A is rotationally fixed to support ring 220A via a radial pin 230, and tip shoe 300B is rotationally fixed to support ring 220B via an axial pin 240. Radial pin 230 may be inserted radially inward so that it extends simultaneously through a first aperture, extending radially through support ring 220A, and a second aperture extending radially into tip shoe 300A. Axial pin 240 may be inserted axially downstream so that it extends simultaneously through a first aperture, extending axially through support ring 220B, and a second aperture extending axially into tip shoe 300B. It should be understood that pins 230 and 240 and their corresponding apertures may be configured in various different manners and oriented in different directions than those illustrated, as long as they prevent rotational motion between support ring 220 and tip shoe 300, so as to prevent rotational motion between support ring 220 and the assembled tip shroud 210. Pins 230 and 240 are contemplated to be unthreaded in a preferred embodiment. However, in an alternative embodiment, pins 230 and/or 240 could be threaded so as to engage with corresponding threads in the respective receiving apertures.

In an embodiment, one or more, including potentially all, tip shoes 300 may be axially fixed to prevent tip shroud 210 from moving axially down longitudinal axis L. In many cases, tip shoes 300 will be axially fixed by abutting other components along their axial ends. For example, tip shoe 300A is illustrated as abutting outer shrouds of stator assembly 144A on an upstream end and stator assembly 144B on a downstream end, thereby preventing axial movement of tip shoe 300A in either direction. However, in some cases, additional features may be provided to prevent axial movement of a tip shoe 300. For example, in the illustrated embodiment, a snap ring 250 is mounted into a radial recess in support ring 220B to abut a radially outward portion of tip shoe 300B on a downstream end of tip shoe 300B. It should be understood that snap ring 250 may be formed as an annulus around longitudinal axis L, so as to abut the downstream end of tip shroud 210 around the entire circumference of tip shroud 210 and prevent downstream movement of tip shroud. 210 While snap ring 250 is illustrated as an axial stop to the second-stage tip shroud 210B of turbine 140, it should be understood that snap ring 250 may be implemented as an axial stop to tip shroud 210 of any stage or any combination of stages of turbine 140.

Figure 3:
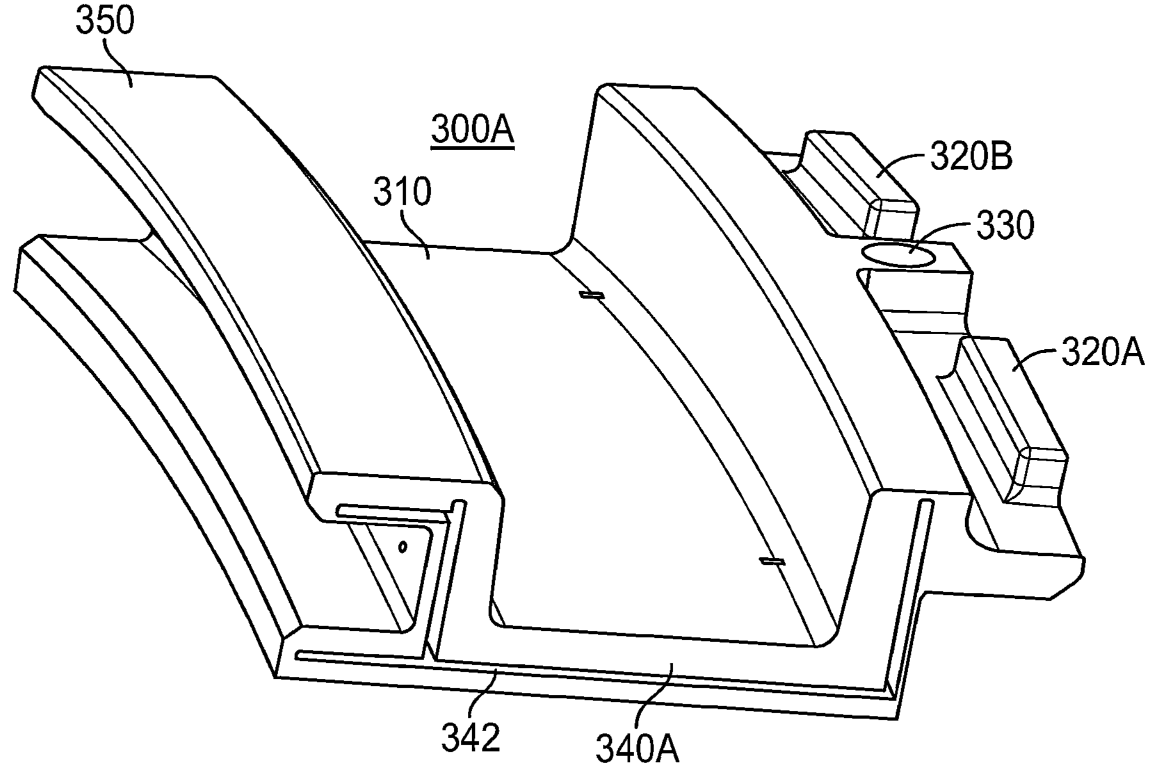
FIGS. 3 and 4 illustrate perspective and aft views, respectively, of an example of a tip shoe, according to an embodiment.
Figure 4:
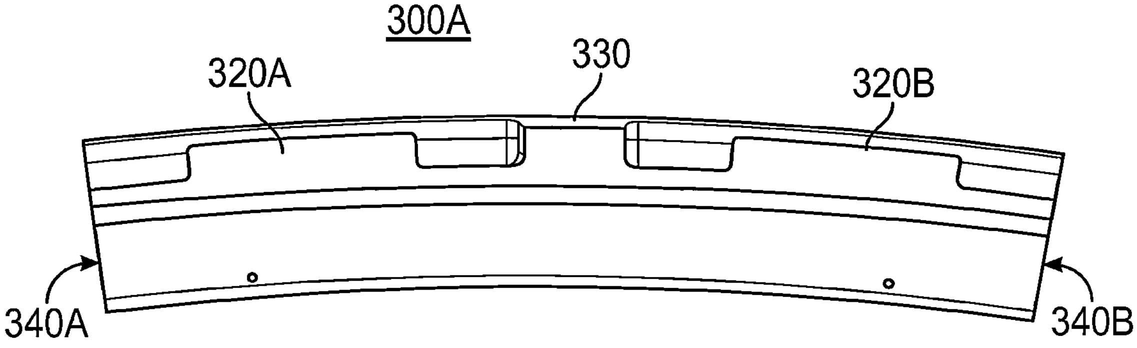

FIGS. 3 and 4 illustrate perspective and aft views, respectively, of an example of a tip shoe 300, according to an embodiment. The example, illustrated in FIGS. 3 and 4, specifically corresponds to tip shoe 300A in FIG. 2. While tip shoe 300A is illustrated as being used in the first stage of turbine 140, tip shoe 300A may be used in a different stage or any combination of stages of turbine 140.

Tip shoe 300A comprises a body 310 and a plurality of puller hooks 320 on a downstream end of body 310. In particular, tip shoe 300A comprises two separate puller hooks 320A and 320B on either side of a radial aperture 330, along a circumference of body 310 around longitudinal axis L. Radial aperture 330 is configured to receive radial pin 230. Each puller hook 320A and 320B may be equidistant from the center of radial aperture 330, and may be the same length as each other. Puller hooks 320A and 320B are illustrated as extending only partially along the circumference of body 310 with spacing between the ends of body 310 and the ends of puller hooks 320, as well as with spacing between radial aperture 330 and each of puller hooks 320A and 320B. Alternatively, each of puller hooks 320A and 320B could extend along the entire circumference of body 310 between a respective end of body 310 and radial aperture 330, or with a different configuration of spacing(s).

Figure 5:
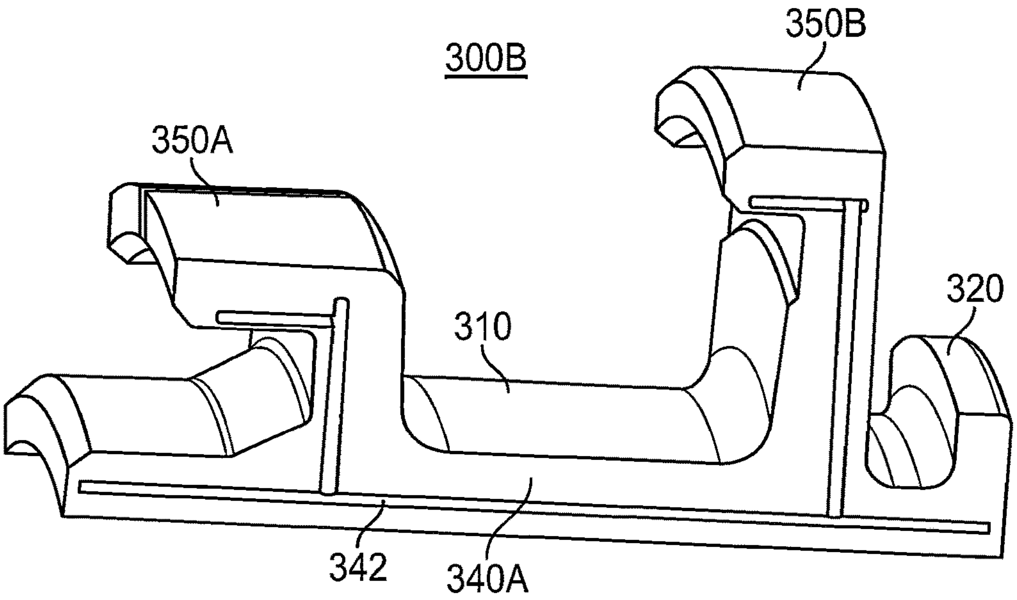
FIGS. 5 and 6 illustrate perspective and aft views, respectively, of another example of a tip shoe, according to an embodiment.
Figure 6:
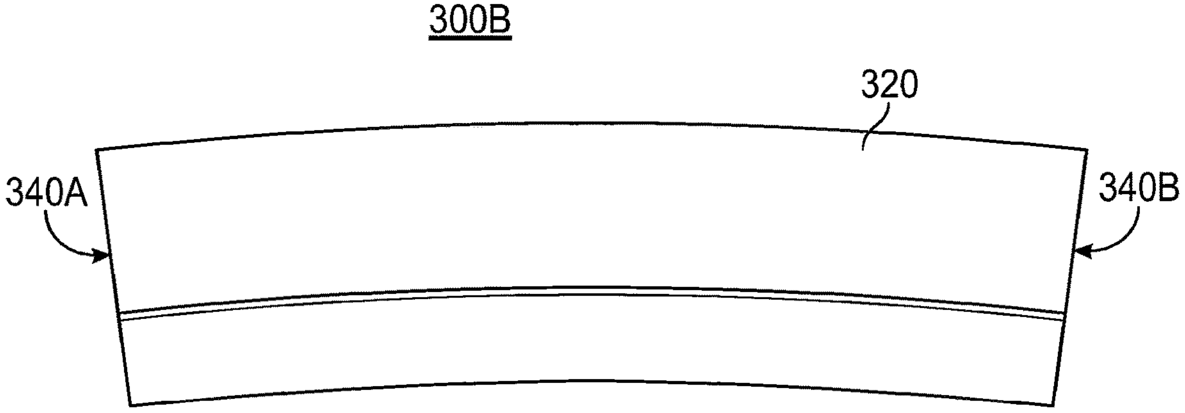

FIGS. 5 and 6 illustrate perspective and aft views, respectively, of another example of a tip shoe 300, according to an embodiment. The example, illustrated in FIGS. 5 and 6, specifically corresponds to tip shoe 300B in FIG. 2. While tip shoe 300B is illustrated as being used in the second stage of turbine 140, tip shoe 300B may be used in a different stage or any combination of stages of turbine 140.

Tip shoe 300B comprises a body 310 and a single puller hook 320, extending substantially the entire circumference of body 310 on the downstream end of body 310. Notably, whereas tip shoe 300B comprises a single continuous puller hook 320, tip shoe 300A comprises a discontinuous puller hook 320, comprising puller hook 320A and 320B, in order to accommodate radial aperture 330. Generally, a discontinuous puller hook 320, such as in tip shoe 300A, may be used in any stage of turbine 140 in which a radial pin 230 is required or desired, and a continuous puller hook 320, such as in tip shoe 300B, may be used in any stage of turbine 140 in which a radial pin 230 is not required or desired. Alternatively or additionally, other design elements may dictate whether to use a single continuous puller hook 320 or a discontinuous plurality of puller hooks 320.

In embodiments in which tip shoe 300 consists of a single continuous puller hook 320, the single continuous puller hook 320 may extend the entire circumference of body 310, or only a portion of the circumference of body 310. In embodiments in which tip shoe 300 comprises a discontinuous plurality of puller hooks 320, the plurality of puller hooks 320 may comprise any number of puller hooks 320 (e.g., two, three, four, etc.), as appropriate for the design of turbine 140.

In the illustrated embodiment, each puller hook 320 comprises or consists of a radial protrusion on the downstream end of body 310 of tip shoe 300. However, it should be understood that the position of puller hook 320 may be dictated by the design of turbine 140. For example, in the illustrated embodiment, each turbine shroud 210 is designed to be disassembled from a downstream end. If, instead, a turbine shroud 210 was designed to be disassembled from an upstream end, each puller hook 320 could comprise a radial protrusion on the upstream end of body 310 of tip shoe 300. In addition, while each puller hook 320 is illustrated as a radially outward protrusion from a radially-outward-facing surface of body 310, each puller hook 310 could, instead, be implemented as a radially inward protrusion from a radially-inward-facing surface of body 310.

As is evident from FIGS. 4 and 6, tip shoe 300 is slightly curved, since tip shoe 300 represents a portion of an annular tip shroud 210 encircling a rotor assembly 142. In particular, each tip shoe 300 comprises two slash faces 340A and 340B on opposing circumferential ends. Each slash face 340A and 340B comprises one or more seal slots 342. One or more seal strips (e.g., thin sheet metal) may be inserted into seal slot(s) 342 of a slash face 340A of a first tip shoe 300 and seal slot(s) 342 of a slash face 340B of a second tip shoe 300 to join the first and second tip shoes 300 together. It should be understood that a full annulus of tip shoes 300 may be assembled in this manner to form a complete tip shroud 210.

Each tip shoe 300 may also comprise one or a plurality of engagement portions 350 that are configured to engage with a respective support ring 220. For example, tip shoe 300A comprises an engagement portion 350 that is configured to engage with a corresponding portion of support ring 220A, and tip shoe 300B comprises two engagement portions 350A and 350B that are configured to engage with corresponding portions of support ring 220B. It should be understood that each tip shoe 300 may comprise any number of engagement portions 350 that are configured to engage with corresponding portions of a respective support ring 220 and/or any other component(s) of turbine 140, as dictated by the design of turbine 140.

Figure 7:
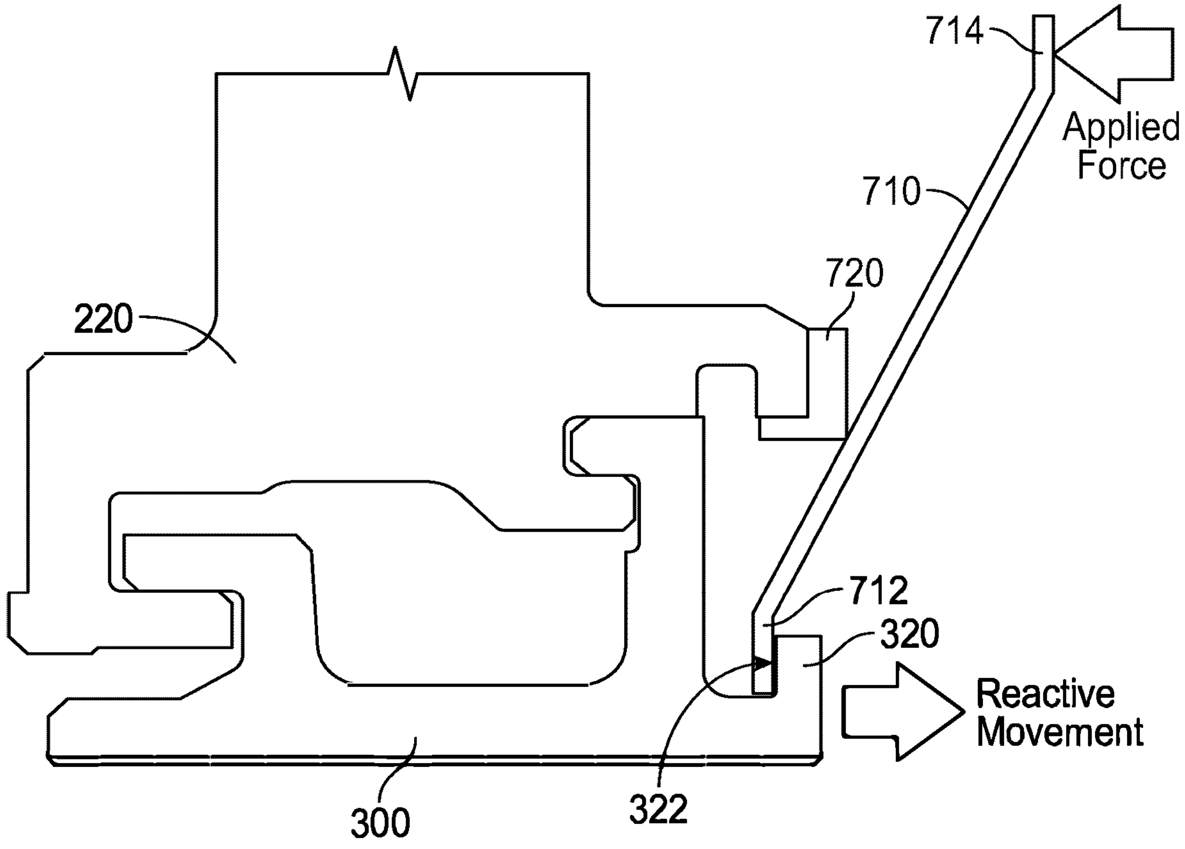
FIG. 7 illustrates the removal of a tip shoe, according to an embodiment.

FIG. 7 illustrates removal of a tip shoe 300 using a puller hook 320, according to an embodiment. In the illustrated example, a first end 712 of a pry bar 710 may be placed against an axially inner surface 312 of puller hook 320. In addition, an optional insert 720 (e.g., made of Delrin™ or other high-load polymer) may be placed on a downstream surface of support ring 220 to protect support ring 220 from damage. An upstream force is then applied to a second end 714 of pry bar, opposite first end 712. This upstream force is transformed by pry bar 710 into a downstream force against an axially inner surface 322 of puller hook 320 to push tip shoe 300 axially downstream and out of the tip shroud 210 and out of engagement with support ring 220. Notably, if a snap ring 250 is used with support ring 220, snap ring 250 should be removed prior to removal of tip shoe 300. Similarly, if a radial pin 230 is used with a radial aperture 330 in tip shoe 300, radial pin 230 should be removed from radial aperture 330 prior to removal of tip shoe 300.

Alternatively, mechanisms other than pry bar 710 may be used to remove tip shoe 300. For example, a slide hammer or similar tool may be used to generate force against axially inner surface 322 of puller hook 320. If a slide hammer is used, the attachment end of the shaft of the slide hammer may comprise or be mounted with a hook that engages with axially inner surface 322 of puller hook 320. Then, a downstream force may be applied to the weight on the shaft, which in combination with the stop of the slide hammer, transfers a downstream force to axially inner surface 322 of puller hook 320, thereby driving tip shoe 300 axially downstream and out of tip shroud 210 and out of engagement with support ring 220.

Figure 8:
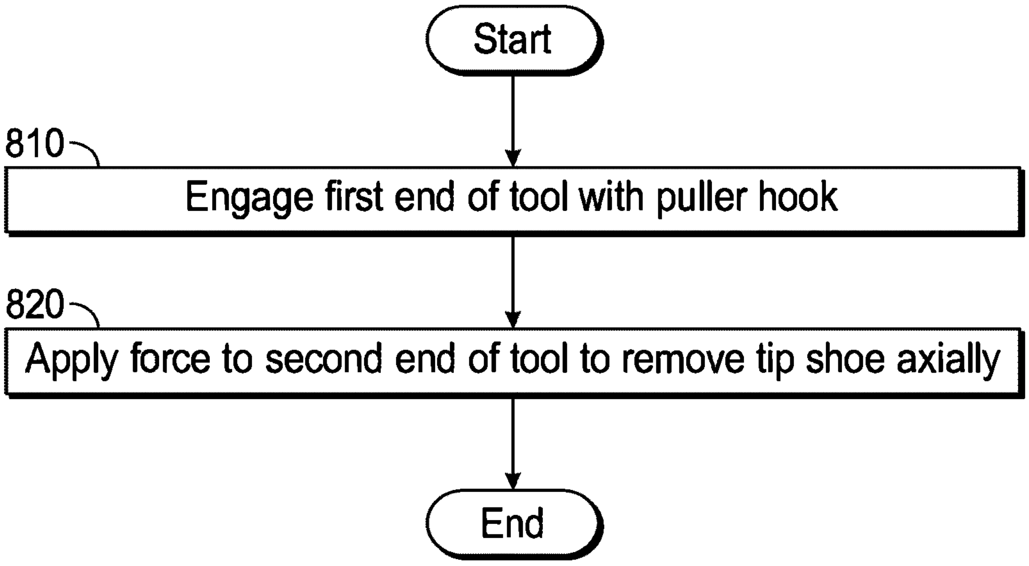
FIG. 8 illustrates a process for removing a tip shoe, according to an embodiment.

FIG. 8 illustrates a process for removing a tip shoe, according to an embodiment. In step 810, a first end of a tool is engaged with puller hook 320. In particular, the first end of the tool (e.g., pry bar or slide hammer) is placed in contact with axially inner surface 322 of puller hook 320. Then, in step 820, a force is applied to the second (e.g., opposite) end of the tool to move tip shoe 300 in an axial direction that is parallel to longitudinal axis L. In the case that the tool is pry bar 710 or similar tool, the axial direction of the force, applied in step 820, is opposite the direction of movement of tip shoe 300. In contrast, in the case that the tool is a slide hammer or similar tool, the axial direction of the force, applied in step 820, is in the same direction as the movement of tip shoe 300.

INDUSTRIAL APPLICABILITY

Embodiments of a tip shoe 300 are disclosed for use in the tip shroud encircling a rotor assembly 142 in one or more stages of a turbine 140 (e.g., the first and second stages). Each tip shoe 300 comprises one or more puller hooks 310 that enable the tip shoe 300 to be more easily removed axially from the tip shroud during disassembly. In particular, conventional tip shoes utilize an axially extending jacking hole in the tip shoe. These jacking holes have a tendency to deteriorate over time, such that removal of conventional tip shoes becomes more difficult over time. In contrast, puller hook 310 enables tip shoes 300 to be removed consistently during each disassembly of turbine 140 (e.g., in a gas turbine engine 100), without deterioration of the removal feature over time.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine, it will be appreciated that it can be implemented in various other types of turbomachinery and machines with tip shrouds, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A tip shoe for forming a tip shroud of a turbine having a longitudinal axis and a radial axis that is orthogonal to the longitudinal axis, the tip shoe comprising:

a body with an upstream end and a downstream end, relative to a longitudinal direction parallel to the longitudinal axis, the body including:

a first engagement portion protruding in a first radial direction parallel to the radial axis and configured to engage with a support ring of the turbine, and a second engagement portion protruding in a second radial direction parallel to the radial axis and configured to engage with the support ring of the turbine; and a puller hook protruding from the downstream end in a third radial direction parallel with the first engagement portion and the second engagement portion, and spaced apart from a downstream side of the second engagement portion to define a void between an upstream side of the puller hook and the downstream side of the second engagement portion, the downstream end comprising a continuous surface extending from the second engagement portion to the puller hook, and the puller hook having an axially inner surface on the upstream side of the puller hook, the puller hook being configured so that a tool can be used to push the tip shoe out of engagement with the support ring by inserting a first segment of the tool into the void and into contact with the axially inner surface of the puller hook, positioning a second segment of the tool radially outward of the puller hook, and applying a force to the second segment of the tool.

2. The tip shoe of claim 1, wherein the first radial direction of the first engagement portion is an outward direction from the longitudinal axis.

3. The tip shoe of claim 1, wherein the first radial direction of the first engagement portion and the second radial direction of the second engagement portion are an outward direction from the longitudinal axis and the first engagement portion and the second engagement portion further extend along the longitudinal direction.

4. The tip shoe of claim 1, further comprising:

an aperture positioned in the first engagement portion and extending in the longitudinal direction.

5. The tip shoe of claim 4, further comprising:

an axial pin positioned in the aperture and configured to extend into the support ring.

6. The tip shoe of claim 1, wherein the puller hook extends along an entire downstream edge of the body.

7. The tip shoe of claim 1, wherein the third radial direction of the puller hook is an outward direction from the longitudinal axis.

8. The tip shoe of claim 1 wherein:

the first engagement portion includes a first flange extending in the longitudinal direction, and the second engagement portion includes a second flange extending in the longitudinal direction.

9. A turbine having a longitudinal axis and a radial axis that is orthogonal to the longitudinal axis, the turbine comprising:

a rotor assembly encircling the longitudinal axis;

a tip shroud encircling the rotor assembly; and a support ring encircling the tip shroud;

the tip shroud including a plurality of tip shoes, each tip shoe including:

a body with an upstream end and a downstream end, relative to a longitudinal direction parallel to the longitudinal axis, the body including:

a first engagement portion protruding in a first radial direction parallel to the radial axis and configured to engage with the support ring, and a second engagement portion protruding in a second radial direction parallel to the radial axis and configured to engage with the support ring; and a puller hook protruding from the downstream end in a third radial direction parallel with the first engagement portion and the second engagement portion, and spaced apart from a downstream side of the second engagement portion to define a void between an upstream side of the puller hook and the downstream side of the second engagement portion, the downstream end comprising a continuous surface extending from the second engagement portion to the puller hook, and the puller hook having an axially inner surface, the puller hook being configured so that a tool can be used to push the tip shoe out of engagement with the support ring by inserting a first segment of the tool into the void and into contact with the axially inner surface of the puller hook, positioning a second segment of the tool radially outward of the puller hook, and applying a force to the second segment of the tool.

10. The turbine of claim 9, wherein the first radial direction of the first engagement portion and the second radial direction of the second engagement portion is an outward direction from the longitudinal axis.

11. The turbine of claim 9, wherein each tip shoe further comprises an aperture positioned in the first engagement portion and extending in the longitudinal direction.

12. The turbine of claim 11, further comprising:

an axial pin positioned in the aperture and extending into the support ring.

13. The turbine of claim 9, wherein the puller hook extends along an entire downstream edge of the body.

14. The turbine of claim 9, wherein the third radial direction of the puller hook protrudes outward from the longitudinal axis.

15. The turbine of claim 9, further comprising:

a snap ring encircling the longitudinal axis and mounted into a radial recess in the support ring and abutting the second engagement portion of each tip shoe.

16. The turbine of claim 9, wherein the support ring includes a segment to provide a surface for the tool to contact when the tool is used to push the tip shoe out of engagement with the support ring.

17. The turbine of claim 9, wherein:

the first engagement portion includes a first flange extending in the longitudinal direction, and the second engagement portion includes a second flange extending in the longitudinal direction.

18. A method of removing a tip shoe from a turbine having a longitudinal axis and a radial axis that is orthogonal to the longitudinal axis, the tip shoe having a body with an upstream end and a downstream end, relative to a longitudinal direction parallel to the longitudinal axis, and a puller hook protruding from the downstream end in a radial direction parallel to the radial axis, the method comprising:

placing a first segment of a tool in contact with an axially inner surface on an upstream side of the puller hook;

positioning a second segment of the tool radially outward of the puller hook, the second segment being opposite the first segment; and applying a force to the second segment of the tool to move the tip shoe in a downstream direction.

19. The method of claim 18, further comprising:

placing a middle segment of the tool in contact with a support ring of the turbine, the middle segment located between the first segment and the second segment, wherein applying the force to the second segment of the tool includes applying a force in an upstream direction, whereby the tool is pivoted on the support ring and a force is applied to the axially inner surface on the upstream side of the puller hook to move the tip shoe in the downstream direction.

* * * * *